V. A. FYNN.
SPEED REGULATING APPARATUS.
APPLICATION FILED JULY 5, 1919.

1,387,048.

Patented Aug. 9, 1921.
2 SHEETS—SHEET 1.

INVENTOR
Valère A. Fynn
BY *[signature]*
ATTORNEY

V. A. FYNN.
SPEED REGULATING APPARATUS.
APPLICATION FILED JULY 5, 1919.

1,387,048.

Patented Aug. 9, 1921.
2 SHEETS—SHEET 2.

INVENTOR
Valère A. Fynn
BY E. E. Huffman
ATTORNEY

UNITED STATES PATENT OFFICE.

VALÈRE A. FYNN, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

SPEED-REGULATING APPARATUS.

1,387,048.  Specification of Letters Patent.  Patented Aug. 9, 1921.

Application filed July 5, 1919. Serial No. 308,865.

*To all whom it may concern:*

Be it known that I, VALÈRE A. FYNN, a subject of the King of England, residing at the city of St. Louis, State of Missouri, United States of America, have invented a certain new and useful Speed-Regulating Apparatus, of which the following is such a full, clear, and exact description as will enable any one skilled in the art to which it appertains to make and use the same, reference being had to the accompanying drawings, forming part of this specification.

My invention relates to electromagnetic means for regulating the speed of prime movers, particularly that of internal combustion engines.

In that type of speed regulating device in which the regulating is accomplished by a current due to the difference of opposed E. M. F.'s a serious difficulty is experienced whenever the apparatus is required to regulate the speed over a wide range. In one known form of such apparatus, the E. M. F. produced by a generator driven by the prime mover is opposed to an E. M. F. independent of the prime mover, such as, for instance, a storage battery, and the torque between the two members of the dynamo electric machine is made use of to control the speed of the prime mover, for instance, by applying same to the throttle valve of the engine. In this device, the armature of the dynamo electric machine is usually driven by the prime mover and its field structure is so arranged that it can revolve about the armature, being normally held against a stop by means of a spring and in mechanical connection with the throttle valve. In another form of the type of device particularly referred to herein, the dynamo electric machine driven by the prime mover has a stationary field structure and is of the usual type, but a controller in the form of a relay, solenoid or motor is connected in circuit with said dynamo electric machine and the opposing battery, and the movable member of the speed controller is placed in mechanical connection with the throttle valve. The simplest and usual way of adjusting the speed of the device referred to is to change the excitation of the dynamo electric machine, but this method has very serious disadvantages and does not permit of successful speed regulation over a wide range.

Figure 1:
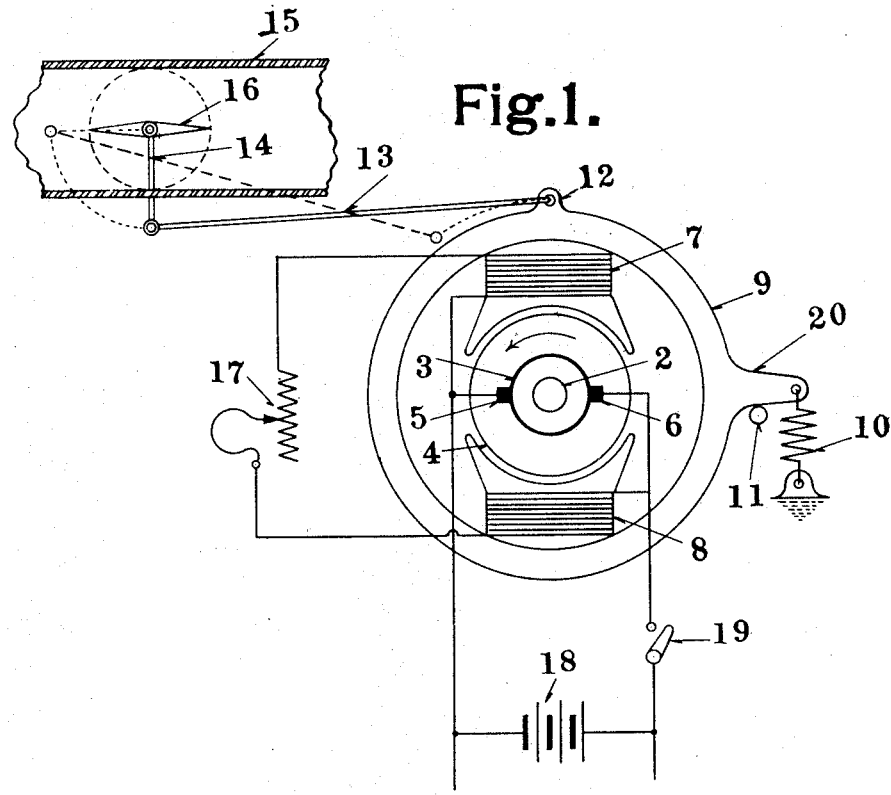
Figure 2:
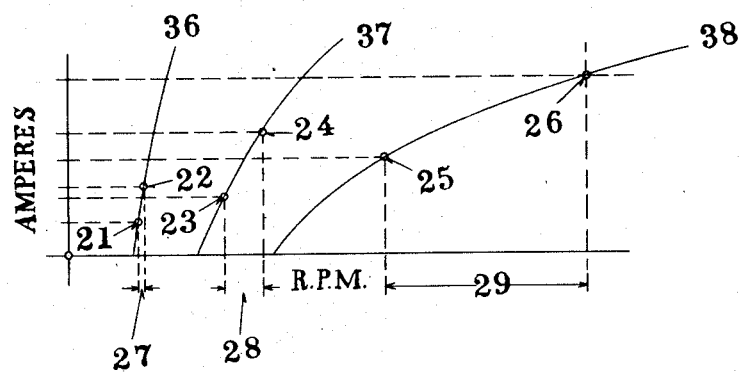
Figure 3:
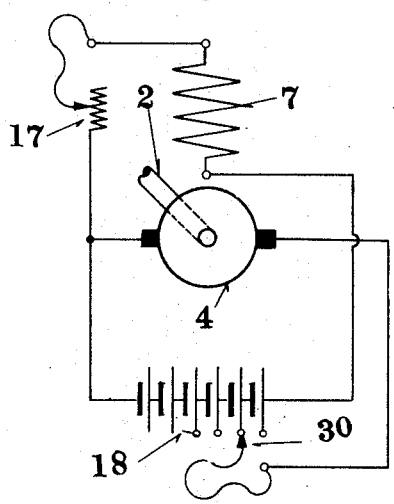

The state of the prior art and my invention will be better understood by reference to the accompanying drawings in which Figure 1 is a representation of one form of known speed regulator to which my invention can be applied with advantage; Fig. 2 is an explanatory diagram; Fig. 3 is one embodiment of my invention applied to the form of device shown in Fig. 1, and Fig. 4 illustrates my invention applied to another form of speed regulator.

In Fig. 1, the armature 4 is driven by the prime mover. The field structure 9 is so arranged that it can move about the shaft 2 of the armature 4. This field structure is normally held against the stop 11 by means of the spring 10 and is connected to the throttle valve 16, located in the intake pipe 15 of the internal combustion engine, by means of the levers 13 and 14. This field structure carries the shunt exciting windings 7, 8 in the circuit of which is included the regulating resistance 17. The brushes 5, 6 coöperating with the commutator 3 of the armature are adapted to be connected to the storage battery 18 by means of the switch 19. The shunt windings 7, 8 are connected to the armature brushes. As long as the spring 10 is in control, the throttle valve 16 is wide open. When the dynamo electric machine sends current into the battery 18, and therefore, a charging current flows through the armature 4, the torque, due to the coöperation of the armature ampere turns produced by the charging current and the flux produced by the exciting windings 7, 8, causes the field structure to move in a counterclockwise direction, thus moving the throttle valve in the direction of its closed position. The larger the charging current, the larger the torque, and therefore the greater the angle of displacement of the field structure. But the charging current increases with the speed and this device therefore prevents any increase in speed over and above an amount determined by the field excitation of the generator. In order to reduce the speed of the prime mover, it is necessary to increase the excitation of the generator, and vice versa. The torque necessary in order to close the throttle valve is practically the same at all speeds because the spring 10 remains constant and it will therefore be immediately apparent that the armature current necessary to produce this torque will be a minimum with maximum excitation, and a maximum with minimum excitation. Furthermore, it is found that the charging current curve as plotted against speed is steepest when the field excitation of the generator is a maximum, but rapidly loses this desirable form as the excitation is reduced, leaning over more and more with decreasing excitation. Both of these peculiarities cause the apparatus to become less and less sensitive, in other words, to regulate less and less closely as the field excitation is reduced for the purpose of increasing the speed of the prime mover. Referring to Fig. 2 curve 36 is typical of a charging current curve with maximum excitation. If the excitation is reduced, the character of the curve will be as shown at 37 and a further reduction in the excitation will produce a charging current curve such as 38. Assuming that with maximum excitation, curve 36, the field structure 9 will begin to move with two ampere charging current (point 21 of curve 36) and will entirely close the throttle valve when the current reaches 4 amperes (point 22 of curve 36), then with the smaller excitation corresponding to curve 37, the field structure 9 will not begin to move until the current has reached 23 and will not close the throttle valve entirely until the current has reached point 24 of curve 37. For a still lower excitation, the working range will be between points 25 and 26 of curve 38. This means that at the lowest speed and with maximum field excitation, the speed will, between no-load and full-load, vary within the small range 27 of Fig. 2. For the second and higher speed, the speed variation will be as indicated by 28 and for the third and highest speed, it will be as indicated by 29.

Figure 4:
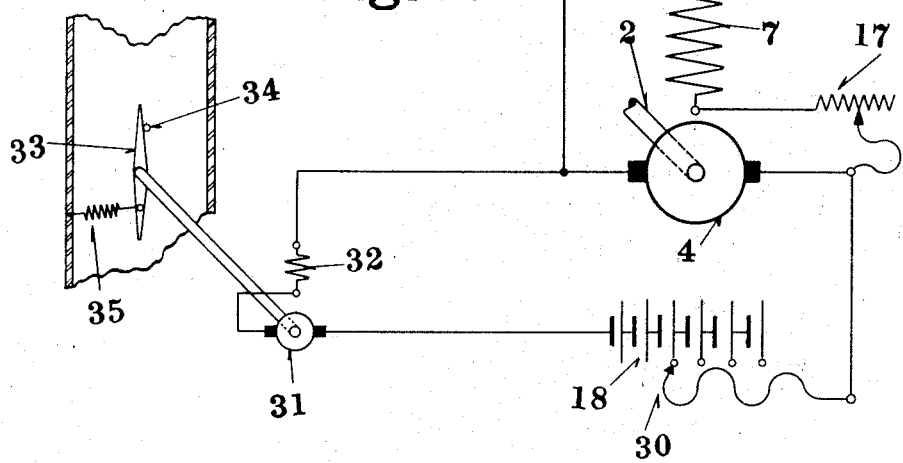

When an electromagnetic controller is interposed between the engine driven generator and the battery as shown in Fig. 4 and the movable member of the controller is connected to the throttle valve, then the steepness of the charging current curve will influence the sensitiveness or closeness of regulation of the apparatus, but this sensitiveness will be independent of the torque between the armature and the field structure of the generator, and the throttle valve will go through its complete cycle within the same range of current for any excitation of the generator. This type of speed regulator is therefore affected to a smaller degree by the characteristics hereinabove referred to.

In order to overcome the defects described, I change the speed of the prime mover by changing the magnitude of the E. M. F. which is independent of said prime mover and which opposes the E. M. F. generated by the dynamo electric machine driven by it. In this way, I can operate at each speed on the maximum excitation curve 36. In most cases, it will be best to combine with a regulation of the opposing voltage, a regulation of the field strength of the engine driven generator covering part of the range in one way, and part of the range in the other way.

In Fig. 3 the invention has been applied to the type of apparatus shown in Fig. 1. The field winding 7 is permanently connected across the six cells of the storage battery 18, and an adjustable resistance 17 is placed in circuit with it, but the armature circuit can, by means of the movable contact 30 be connected to either 3, 4, 5 or 6 cells. If the speed of the prime mover with 3 cells in circuit and maximum excitation is 400, then it will be 800 with 4, 1000 with 5, and 1200 with 6 cells in circuit with the armature. Intermediate and higher speeds can be secured by reducing the field excitation by means of the adjustable resistance 17.

In Fig. 4 the invention is applied to a speed regulating device comprising a generator 4 driven by the prime mover provided with an exciting winding 7 in circuit with the regulating resistance 17 and driven by the prime mover. The armature of this generator is connected in series with the battery 18 and the speed controller 31, 32 which is here shown in the form of a series motor. The armature of this motor is connected to the throttle valve 33 normally held in its open position against the stop 34 by the spring 35. In this example, the voltage applied to the exciting winding 7 is varied, together with the opposing E. M. F. independent of the prime mover. If it is desired to keep the excitation constant while varying the number of cells in series with the armature 4, it is necessary to correspondingly adjust the resistance 17.

From the foregoing it will be noted that my invention in its broadest aspect comprises means procuring as sensitive electromagnetic regulation for one desired speed as for another by adjusting the magnitude of an E. M. F. which is independent of the speed.

Having fully described my invention, what I claim as new and desire to secure by Letters Patent of the United States is:

1. The combination with a prime mover of a speed controlling device therefor, and means for actuating said controlling device, said means comprising a dynamo electric machine driven by the prime mover and an independent source of E. M. F. in circuit therewith, and means for varying the magnitude of said independent E. M. F.

2. The combination with a prime mover of a speed controlling device therefor, electro-magnetic means for actuating the speed controlling device, a dynamo electric machine driven by the prime mover and in circuit with said electromagnetic means, an independent source of E. M. F. also in circuit with the said electromagnetic means and with the dynamo electric machine, and means for varying the magnitude of said E. M. F.

3. The combination with a prime mover of a speed controlling device therefor, and means for actuating said controlling device, said means comprising a dynamo electric machine driven by the prime mover and an independent source of E. M. F. connected to oppose the E. M. F. of the dynamo electric machine, means for varying the magnitude of said independent E. M. F., and means for varying the excitation of the dynamo electric machine.

4. The combination of an internal combustion engine, a throttle valve therefor, an electromagnetic controller for actuating said throttle valve, a dynamo electric machine driven by the engine and in circuit with the controller, an independent source of E. M. F. in circuit with the controller and the dynamo electric machine, and means for varying the magnitude of said independent E. M. F.

In testimony whereof I have hereunto set my hand and affixed my seal.

VALÈRE A. FYNN. [L. S.]